(12) United States Patent
Staney

(10) Patent No.: US 7,374,137 B2
(45) Date of Patent: May 20, 2008

(54) DIRECTIONAL SUPPORT STRUCTURE

(76) Inventor: Wayne Staney, 2212 E. University Ave., Urbana, IL (US) 61802

( * ) Notice: Subject to any disclaimer, the term of this patent is extended or adjusted under 35 U.S.C. 154(b) by 154 days.

(21) Appl. No.: 11/326,589

(22) Filed: Jan. 4, 2006

(65) Prior Publication Data
US 2007/0152124 A1  Jul. 5, 2007

(51) Int. Cl.
*A47F 5/00* (2006.01)
*A47F 7/00* (2006.01)
*F16M 11/00* (2006.01)
*F16M 13/00* (2006.01)

(52) U.S. Cl. ............... 248/122.1; 248/121; 248/123.11; 248/125.1; 248/125.2; 248/371; 248/372.1; 248/419; 248/284.1; 248/291.1; 248/516; 248/292.11; 248/292.12; 248/292.13; 248/125.7; 248/415; 248/425; 248/354.1; 403/261; 403/335; 403/336; 403/337; 16/286; 16/290; 108/6; 108/8; 108/9; 108/10; 108/145; 343/878; 343/880; 343/882; 343/892; 343/765; 343/757; 343/883

(58) Field of Classification Search ............ 248/122.1, 248/121, 123.11, 125.1, 125.2, 371, 372.1, 248/419, 284.1, 291.1, 516, 292.11, 292.12, 248/292.13, 125.7, 415, 425, 354.1; 403/261, 403/335–337; 16/286, 290; 108/6, 8–10, 108/145; 343/878, 880, 882, 892, 765, 757, 343/883

See application file for complete search history.

(56) References Cited

U.S. PATENT DOCUMENTS

| | | | | |
|---|---|---|---|---|
| 3,593,954 A | * | 7/1971 | Ritchie et al. ............. 248/215 |
| 3,714,660 A | | 1/1973 | Scrafford et al. |
| 3,940,771 A | | 2/1976 | Wild |
| 4,126,865 A | * | 11/1978 | Longhurst et al. .......... 343/766 |
| 4,138,991 A | * | 2/1979 | Lorenz ....................... 126/713 |
| 4,232,320 A | | 11/1980 | Savalle, Jr. |
| 4,251,819 A | | 2/1981 | Vickland |
| 4,300,537 A | | 11/1981 | Davis |
| 4,545,557 A | | 10/1985 | Rogers |
| 4,617,572 A | * | 10/1986 | Hugo .......................... 343/765 |
| 4,783,662 A | | 11/1988 | Wirth, Jr. et al. |
| 4,799,064 A | * | 1/1989 | Nakamura .................. 343/766 |
| 4,799,642 A | | 1/1989 | Wright |
| 4,819,006 A | * | 4/1989 | Whitesides et al. ......... 343/880 |
| 4,819,007 A | * | 4/1989 | Tezcan ....................... 343/840 |
| 4,895,990 A | * | 1/1990 | Sargent et al. .............. 570/130 |
| 4,918,363 A | * | 4/1990 | Hollis et al. ................ 318/626 |
| 4,922,264 A | | 5/1990 | Fitzgerald et al. |
| 5,007,560 A | * | 4/1991 | Sassak .......................... 222/1 |
| 5,075,682 A | * | 12/1991 | Dehnert ...................... 342/352 |

(Continued)

*Primary Examiner*—Anita King
*Assistant Examiner*—Nkeisha Dumas
(74) *Attorney, Agent, or Firm*—McHale & Slavin, P.A.

(57) ABSTRACT

A directional support structure for use with solar panels, flat satellite antennas, and the like items that are directed toward a point in space. The support structure includes a mounting plate with an extension tube extending outwardly therefrom, pivotally secured to a mounting bracket permitting rotational azimuth alignment of the mounting plate. At least one locking turnbuckle is attached between the extension tube and the mounting bracket to provide locking and vertical adjustable alignment of the mounting plate. The base member includes an attached first flange positioned along an upper end of the base member, an attached flaring positioned on the lower end of the mounting bracket, and an unattached second flange positioned over the flaring, securable to the first flange with fasteners.

19 Claims, 6 Drawing Sheets

U.S. PATENT DOCUMENTS

| | | | | |
|---|---|---|---|---|
| 5,355,145 A | * | 10/1994 | Lucas | 343/882 |
| 5,512,913 A | * | 4/1996 | Staney | 343/781 P |
| 5,576,722 A | * | 11/1996 | Bustillos | 343/882 |
| 5,614,918 A | | 3/1997 | Dinardo et al. | |
| 5,798,517 A | * | 8/1998 | Berger | 250/203.4 |
| 6,037,913 A | * | 3/2000 | Johnson | 343/882 |
| 6,195,066 B1 | | 2/2001 | Pegues, Jr. et al. | |
| 6,284,968 B1 | | 9/2001 | Niesyn | |
| 2007/0052604 A1 | * | 3/2007 | Young et al. | 343/757 |
| 2007/0095993 A1 | * | 5/2007 | Yamamoto | 248/284.1 |

* cited by examiner

US 7,374,137 B2

DIRECTIONAL SUPPORT STRUCTURE

FIELD OF THE INVENTION

The present invention relates to a field of support structures and, more particularly, to a support structure for solar panel collectors, satellite antennas and other objects that need to be fixed toward a point in space.

BACKGROUND INFORMATION

Solar panels and satellite antennas are directed to a particular point in space to be effective. A solar panel collector must either be directed toward the sun where it will be most effective or made to track the sun as it moves across the sky. Solar panels are used to collect energy from the Sun and require optimum positioning whether the energy is for heating of water or providing electrical power. The weight of the panels is dependant upon the panel size but can be quite heavy if the solar panel includes circulating water.

Satellite antennas, both flat and parabolic, can be found throughout the world for communication purposes. These antennas must also be directed to a particular point in space to be effective. Solar panels and satellite antennas both require support structures capable of adjustment yet capable of inhibiting all movement even if presented with high winds.

One of the problems with the prior art support structures is their inability to both precisely hold large directional objects while allowing for ease of adjustment. For instance, if a solar panel is designed to be fixed, as opposed to tracking, a necessity for the safety of the installers is paramount. This need arises as conventional support structures place a burden upon the installer to prevent damage during directional positioning. Prior art devices have not disclosed the necessity for a support structure capable of withstanding extremely high winds from causes such as hurricanes. Such high winds can cause misadjustment if the panel moves even one inch.

Thus, what is lacking in the art is a heavy duty directional support structure capable of holding large heavy panels yet provide ease in directionally pointing by allowing the installer to rotate and tilt the directional panel as necessary.

SUMMARY OF THE INVENTION

Set forth is a directional support structure for use with solar panels, flat or raised satellite antennas, and the like structures required to be directionally facing a fixed point in space. The directional support structure includes an adjustable bracket that allows for pivoting of the mounting plate even when the mounting plate is loaded with solar panels or satellite panels, despite the weight of such devices. Rotational or azimuth movement is maintained by use of a mounting bracket secured to a base member that allows rotation with operator safety in mind by eliminating disengagement of the directional devices once they are secured to the mounting plate. Upon proper rotational placement, flanges are fastened together sandwiching a flaring located on the lower end of the mounting bracket thereby preventing further rotational movement. An adjustment bracket is provided to allow latitude adjustment of the mounting plate by use of turn buckles that provide precise adjustment and absolute rigidity upon locking of the turn buckles. A base member includes a hollow column that can be placed in the ground or bolted on a fixed structure. The column is hollow to provide a wire chase for concealment of pipes and/or electrical wiring.

Thus, an objective of the instant invention is to disclose a directional support structure capable of azimuth and latitude adjustment despite the weight of the devices to be directionally positioned.

Yet another objective of the invention is to provide a support structure that provides a safe structure for installers by creating a rigid mounting base that allows for positional adjustment.

Still another objective of the instant invention is to provide an industrial stand capable of withstanding weather extremes such as hurricane winds, without movement of the positioning elements.

Still another objective of the instant invention is to disclose the use of a universal mounting plate capable of holding a plurality of solar panel basins.

Still another objective of the instant invention is to disclose the use of solar panel basins that allow for the flush mount of solar panels to protect from side wind lifting.

Still another objective of the instant invention is to teach the use of a mounting plate that can be used for devices that require directional placement including satellite antenna panels.

The above-stated objectives as well as other objectives not specifically stated, are within the scope of the present invention, and will become apparent from the Derailed Description of the Invention, Drawings, and Claims.

DESCRIPTION OF THE PREFERRED EMBODIMENTS

Detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriate structure.

Figure 1:
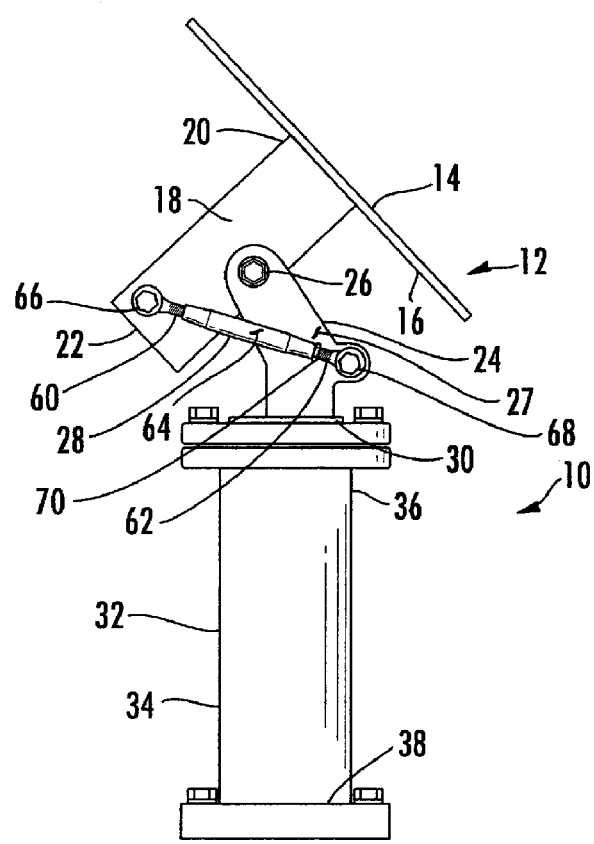
FIG. 1 is a side plane view of the Directional Support Structure.
Figure 1A:
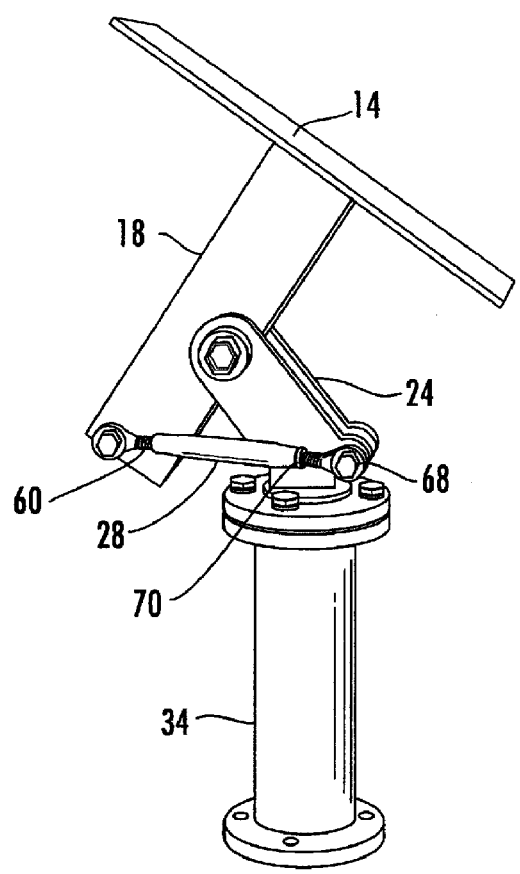
FIG. 1a is a pictorial of FIG. 1.

Referring now to FIGS. 1 and 1a, set forth is a side view of the directional support structure 10 which consists of a mounting plate 12 having a front surface 14 and a rear surface 16. The mounting plate includes mounting apertures, not shown, that can be pre drilled or the mounting plate can be modified for receipt of solar panels, antennas, solar panel basins, and the like type objects that need directional positioning toward a point in space. The mounting plate 12 is coupled to an extension tube 18 having a proximal end 20 secured to the rear surface 16 with a mounting plate. Securement of the extension tube 18 to the mounting plate 12 is preferably a weldment providing structural strength for carrying of heavy objects. The extension tube maintaining rigidity from heavy loads such as snow, or high winds arising from causes such as hurricanes. The extension tube 18 is preferably mounted perpendicular to the mounting plate and extending outwardly to a distal end 22 placed at a position that allows for proper pivoting as explained herein. The extension tube 18 is pivotally mounted to a mounting bracket 24 by pivot point fastener 26. Preferably the pivot point is a fastener that extends from one side of the extension tube to the opposite side and coupling to a first mounting bracket 24 which may be of a single side or preferably includes a second bracket 27 forming a mirror image of the first mounting bracket. In this manner the mounting bracket 24 is positioned on each side of the extension tube with the pivot point fastener 26 extending through the extension tube and is tightened to prevent lateral movement of the extension tube but maintain pivoting by adjustment of turn buckle coupling 28. The mounting bracket 24 permits latitude alignment of the mounting plate 12 by pivoting of the extension tube 18 along pivot point fastener 26. A second end 30 of the mounting bracket is secured to base member 32.

The base member 32 is formed from a hollow upright column 34 defined by an upper end 36 spaced apart from a lower end 38 a distance to allow clearance of the mounting plate 12 from contacting an object when a solar panel or antenna is placed thereon. This is particularly helpful when the base member is mounted on the ground wherein the mounting plate extends up over the ground a distance which will handle most average snow falls, and allows shrubbery or other lawn items to be placed around the base without interfering with the solar panel and or satellite antenna reception.

Figure 2:
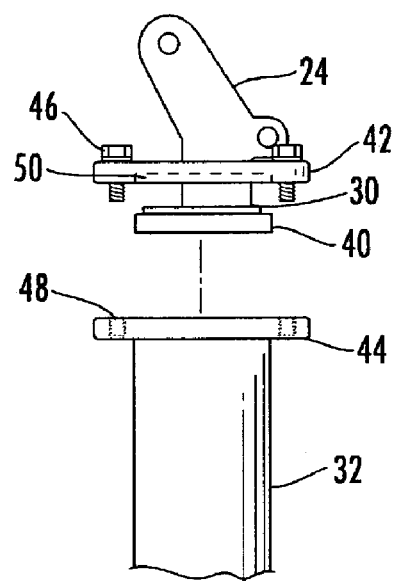
FIG. 2 is an exploded view illustrating a flaring attached to a lower end of the mounting bracket.

Referring now to FIG. 2 the base member 32 is coupled to the mounting bracket 24 by use of flanges and a flare. In a preferred embodiment a flare 40 is mounted to the bottom 30 of the mounting bracket with a movable flange 42 positioned on said mounting bracket and available for attachment to a cooperating second flange 44 located on the upper end of the base member 32. The first flange 42 includes fasteners 46 which are preferably threaded bolts for insertion in engagement with threaded apertures 48 located on the second flange 44. During installation the first flange is loosely coupled to the second flange sandwiching the flaring 40 there between. The mounting bracket 24 can be rotated as necessary for directional alignment of the device to be pointed toward a point in space and upon proper alignment the first flange 42 is securely fastened to the second flange 44 by placement of threaded bolts 46 tightly into apertures 48 thereby sandwiching the flare in 40 there between.

Figure 2A:
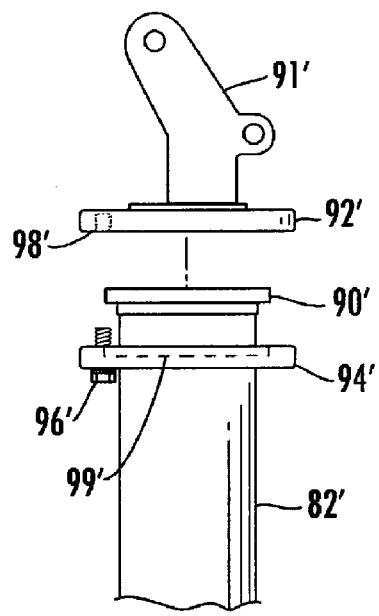
FIG. 2a is an exploded view illustrating a flaring attached to the upper end of the base member.

In a preferred embodiment the first flange 42 includes a receptacle 50 sized to cooperate with the flare 40, thereby capturing the flare in a fixed position. Alternatively, referring to FIG. 2a, the first flange 92' is permanently secured to the mounting bracket 91' wherein the flare 90' is permanently attached to base member 82'. In this embodiment a second flange 94' is coupled to the first flange 92', sandwiching the flare 90' there between. Similar to the first embodiment, fasteners 96' engage threaded apertures 98' to cause a tight sandwich between the first and second flange, thereby fixing the flare 90' in between. Similarly in the second embodiment, the second flange 94' may include a receptacle 99' sized to receive the flare 90', all of which are fixed to base member 82'.

Again referring FIG. 1 the turn buckle 28 is adjustable having a left hand thread 60 and a right hand thread 62. By rotation of the turn buckle body 64 the extension tube 18 can be tilted by causing the distal end 22 to be narrowed or spaced apart from the mounting bracket lower end 30. The turn buckle is pivotally coupled to the extension tube by fastener 66 into the mounting bracket by fastener 68. When the turn buckle is rotated to present the proper latitude alignment of the mounting plate 12 a locking nut 70 can be tightened against the body of the turn buckle 64 to prevent movement. For ease of simplicity, only a single turn buckle is described. A second turn buckle forms a mirror image of the first turn buckle. In addition, it should be noted that the left hand and right hand threads could be reversed and other devices may be employed for the purpose of extending or diminishing the distance between end 30 and the distal end 22 of the extension tube for purposes of causing latitude tilting of the mounting plate 12.

Figure 3:
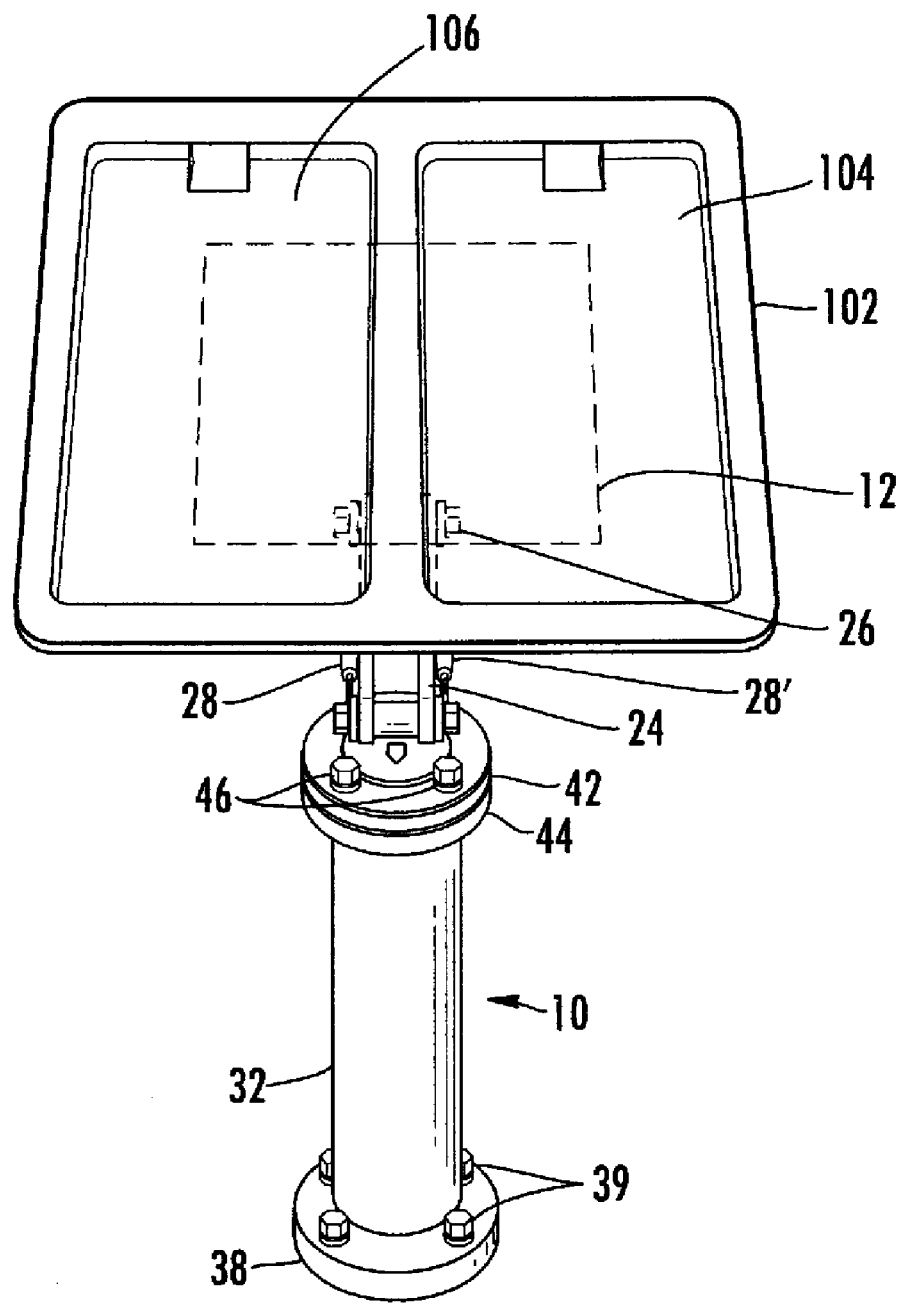
FIG. 3 illustrates a front perspective view of the Directional Support Structure within an attached basin for receipt of solar panels.
Figure 3A:
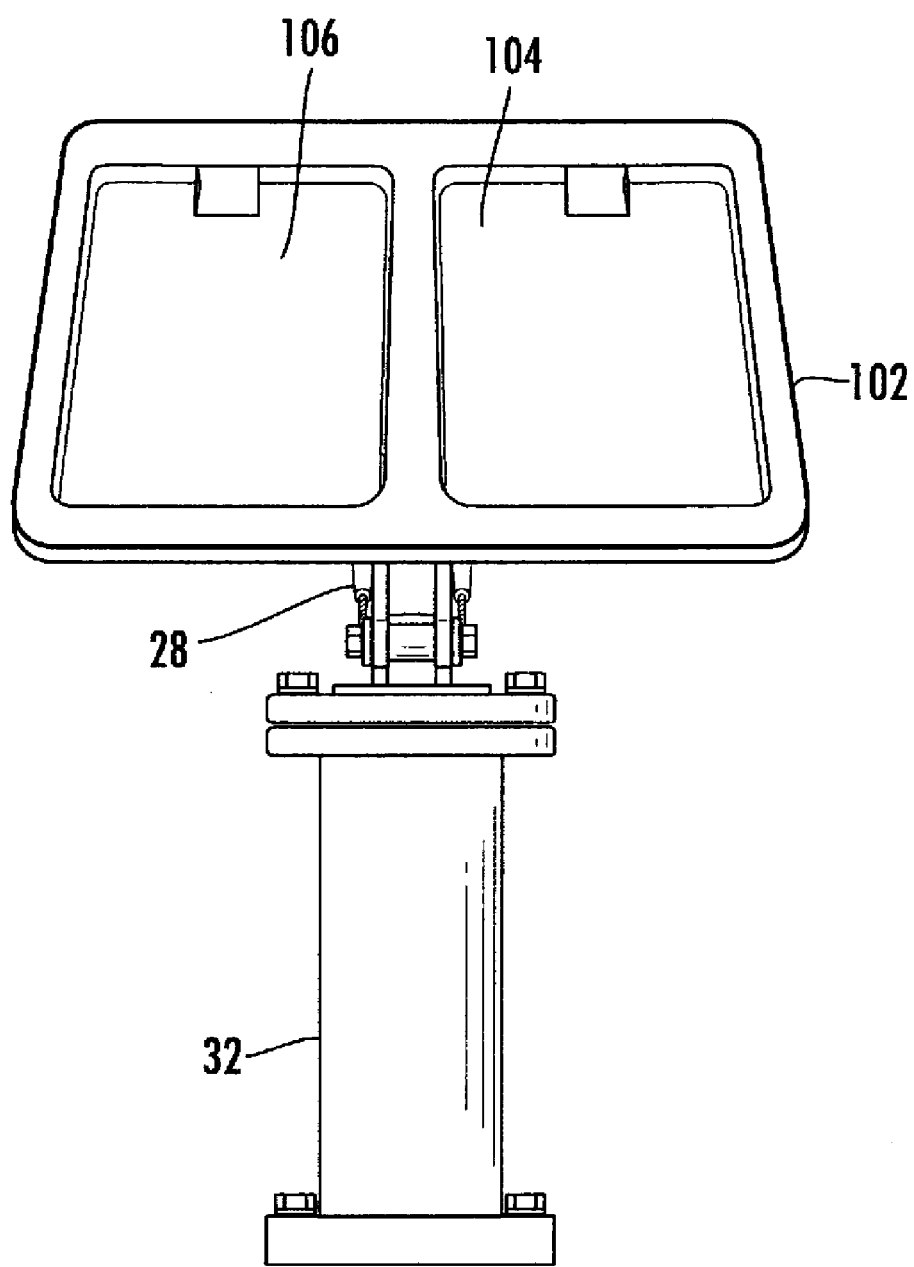
FIG. 3a is a pictorial of FIG. 3.
Figure 4:
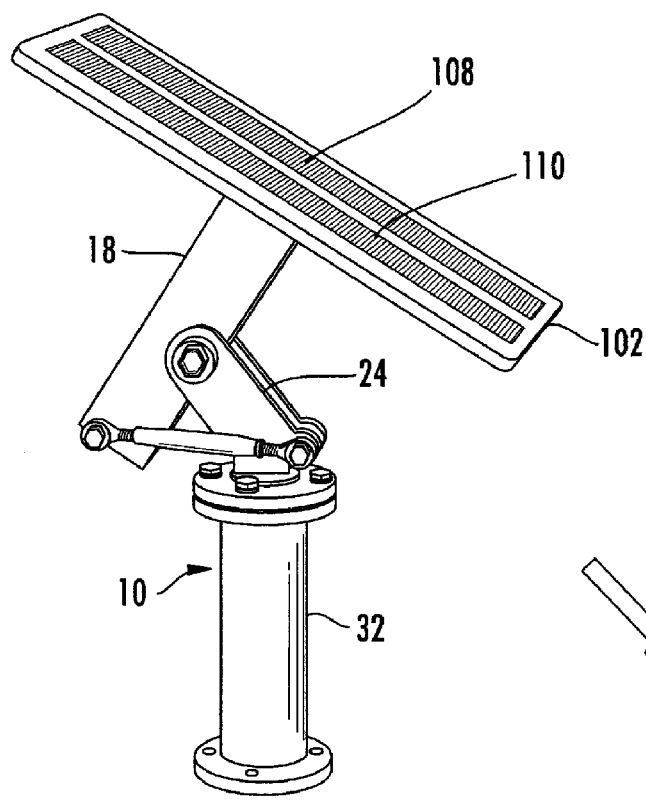
FIG. 4 is a side perspective of the Directional Support Structure with solar panels placed in a basin.
Figure 4A:
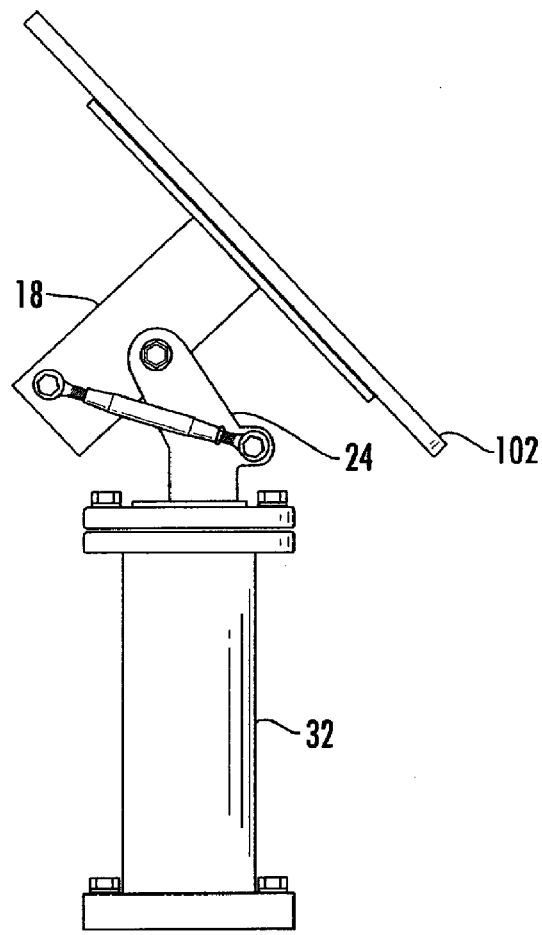
FIG. 4a is a pictorial of FIG. 4.

Now referring to FIG. 3, set forth is a front perspective view of the directional support structure 10 depicting the base member 32 having a lower flange 38 secured to a rigid structure, not shown, by fasteners 39. The upper end of the base member having secured to mounting bracket 24 by first flange 42 fastened to second flange 44 by fasteners 46. The mounting bracket is pivotally secured to the mounting plate 12 by the pivot point fastener 26 and adjusted by use of turn buckles 28 and 28'. In the preferred embodiment the use of tie-rods, or in particular, turn buckles on each side of the mounting bracket 24 provides rigidity by using the extension tube which is preferably a square or rectangular rigid material providing absolute rigidity wherein the hollow column may include a wire chase. In this embodiment the use of a solar collector basin 102 is illustrated. The solar basin includes recessed cavities 104 and 106 that allow placement of the panels into the basin allowing the solar panels to remain flush to prevent loading of the panels by wind or other elements that would other wise structurally effect the strength and efficiency of the solar panels. FIG. 4 depicts the solar panels 108 and 110 placed in the receptacles or tub basins. It should be noted that a single receptacle or multiple receptacles may be employed depending upon the type of solar panel utilized. Elements 10, 18, 24, 32 and 102 are identified in previous figures.

Figure 5:
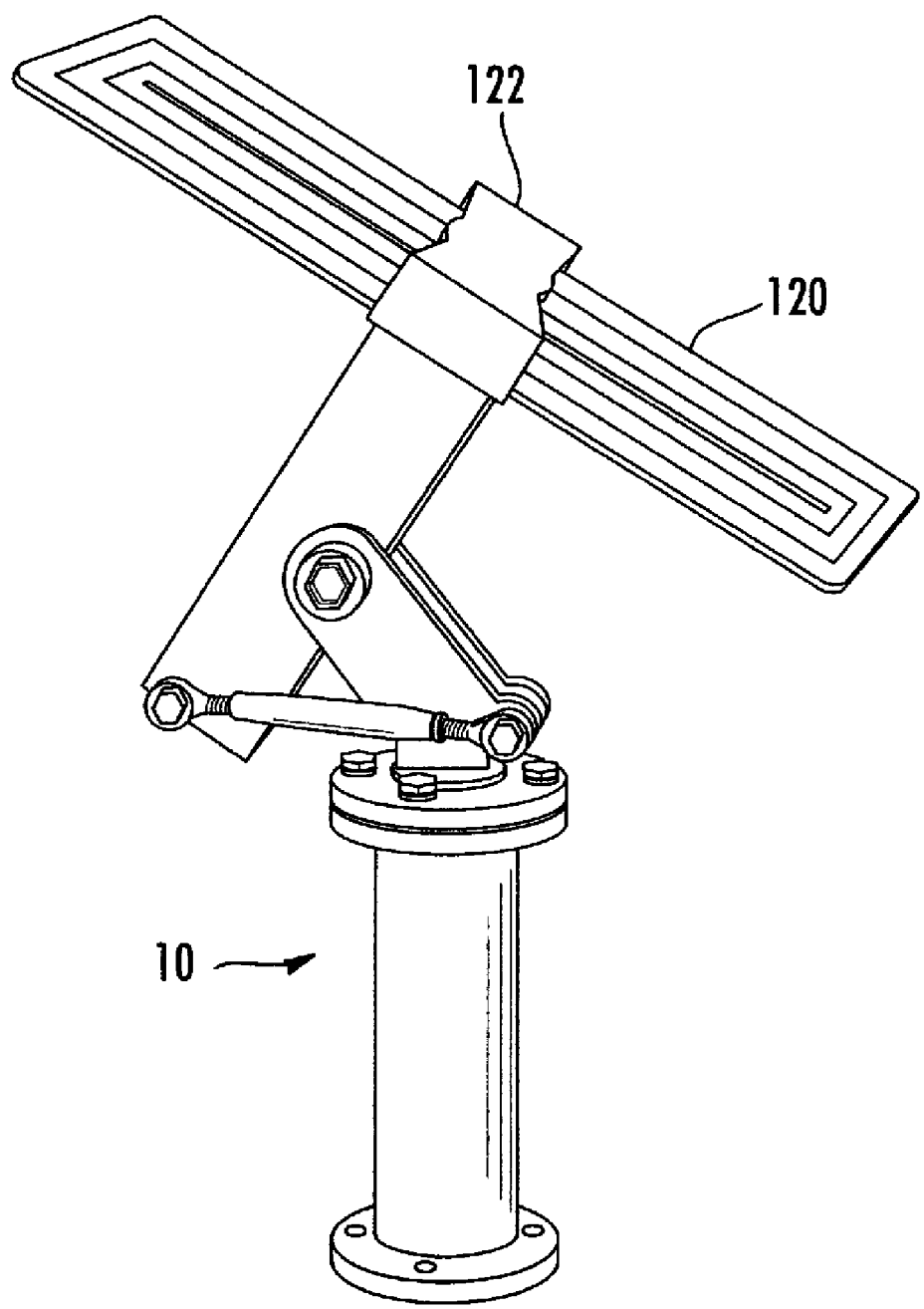
FIG. 5 is a side perspective view of the Directional Support Structure with a satellite antenna and collector.

Referring to FIG. 5 set forth is an illustrated example of an alternative embodiment for use with the directional support structure 10 wherein a flat antenna device 120 is employed having a signal collector 122 positioned over the satellite panel 120 for signal reception. Flat panels are known in the art as being by the instant inventor such as that set forth in U.S. Pat. No. 5,512,913 being a flat plate antenna, the contents of which are incorporated herein in by reference.

It should be understood that the foregoing relates to only preferred embodiments of the present invention, and that it is intended to cover all changes and modifications of the embodiment of the invention herein used for the purposes of disclosure, which do not institute departures from the spirit and scope of the invention.

What is claimed is:
1. A directional support structure comprising:
   a mounting plate having a front surface and a rear surface;
   an extension tube having a proximal end secured to said rear surface with a distal end extending outwardly therefrom and perpendicular thereto;

a mounting bracket having a first end pivotally secured to said extension tube permitting latitude alignment of said mounting plate, and a second end secured to a base member permitting rotational positioning of said mounting plate, said base member formed from an upright column defined by a upper end spaced apart from a lower end; and at least one adjustable tie rod coupling said extension tube said mounting bracket, said tie rod coupling fixating said latitude alignment of said mounting plate; an attached first flange positioned to said upper end of said base member, an attached flaring positioned to said lower end of said mounting bracket, and an unattached second flange positioned over said flaring and securable to said first flange with fasteners, wherein said mounting bracket may be rotationally positioned and said flanges fastened together to lock said mounting bracket in a fixed position, whereby items placed on said front surface of said mounting plate can be optimally positioned to face a point in space by rotatably adjusting said mounting bracket and by pivotedly adjusting said extension tube.

2. The directional support structure according to claim 1 wherein said tie rod is further defined as a variable length turn buckle having left hand and right hand treads for securing said latitude alignment of said mounting plate.

3. The directional support structure according to claim 2 wherein said turnbuckle is includes a locking nut.

4. The directional support structure according to claim 1 wherein said upright column is hollow.

5. The directional support structure according to claim 1 wherein said lower end of said base member is inserted into the ground.

6. The directional support structure according to claim 1 including an anchor flange secured to the bottom of said vertical column, said anchor flange available for attachment to a rigid foundation by use of fasteners.

7. The directional support structure according to claim 1 wherein said flaring is attached to said upper end of said base member and said unattached second flange is positioned beneath said flaring and securable to said first flange with fasteners, wherein said mounting bracket may be rotationally positioned and said flanges fastened together to lock said mounting bracket in a fixed position.

8. The directional support structure according to claim 1 including a tub basin securable to said mounting plate, said tub basin recessed and receptive to the placement of at least one flush mounted solar panel.

9. The directional support structure according to claim 8 wherein said tub basin includes at least one recessed cavity for receipt of additional solar panels.

10. The directional support structure according to claim 1 wherein said mounting plate is receptive to a flat satellite panel antenna.

11. The directional support structure according to claim 10 including a signal collector coupled to opposite edges of said mounting plate and bridging across said flat satellite panel antenna.

12. A directional support structure comprising:

a mounting plate having a front surface and a rear surface;

an extension tube having a proximal end secured to said rear surface with a distal end extending outwardly therefrom and perpendicular thereto;

a mounting bracket having a first end pivotally secured to said extension tube permitting latitude alignment of said mounting plate, and a second end secured to a base member permitting rotational positioning of said mounting plate, said base member formed from a hollow upright column defined by a upper end spaced apart from a lower end, said base member having an attached first flange positioned to said upper end of said base member, an attached flaring positioned to said lower end of said mounting bracket, and an unattached second flange positioned over said flaring and securable to said first flange with fasteners, wherein said mounting bracket may be rotationally positioned and said flanges fastened together to lock said mounting bracket in a fixed position; and at least one adjustable turnbuckle coupling said extension tube said mounting bracket, said turnbuckle coupling fixating said latitude alignment of said mounting plate, said turnbuckle includes left hand and right hand treads for securing said latitude alignment of said mounting plate;

whereby items placed on said front surface of said mounting plate can be optimally positioned to face a point in space by rotatably adjusting said mounting bracket and by pivotedly adjusting said extension tube.

13. The directional support structure according to claim 12 wherein said turnbuckle includes a locking nut.

14. The directional support structure according to claim 12 wherein said hollow column includes a wire chase.

15. The directional support structure according to claim 12 wherein said lower end of said base member is inserted into the ground.

16. The directional support structure according to claim 12 including an anchor flange secured to the bottom of said vertical column, said anchor flange available for attachment to a rigid foundation by use of fasteners.

17. The directional support structure according to claim 12 wherein said flaring is attached to said upper end of said base member and said unattached second flange is positioned beneath said flaring and securable to said first flange with fasteners, wherein said mounting bracket may be rotationally positioned and said flanges fastened together to lock said mounting bracket in a fixed position.

18. The directional support structure according to claim 12 including a tub basin securable to said mounting plate, said tub basin recessed and receptive to the placement of at least one flush mounted solar panel.

19. The directional support structure according to claim 12 wherein said mounting plate is receptive to a flat satellite panel antenna.

* * * * *